United States Patent
Simske et al.

(10) Patent No.: US 10,268,857 B2
(45) Date of Patent: Apr. 23, 2019

(54) DATA BEARING IMAGE RELATED TO A COMPILATION AND POSITION

(71) Applicant: Hewlett-Packard Development Company, L.P., Spring, TX (US)

(72) Inventors: Steven J Simske, Fort Collins, CO (US); A. Marie Vans, Fort Collins, CO (US); Udi Chatow, Palo Alto, CA (US); Vernica Rares, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,034

(22) PCT Filed: Jun. 15, 2015

(86) PCT No.: PCT/US2015/035740
§ 371 (c)(1),
(2) Date: Oct. 27, 2017

(87) PCT Pub. No.: WO2016/204717
PCT Pub. Date: Dec. 22, 2016

(65) Prior Publication Data
US 2018/0121697 A1 May 3, 2018

(51) Int. Cl.
G06K 19/06 (2006.01)
G06K 7/14 (2006.01)
G06Q 10/08 (2012.01)

(52) U.S. Cl.
CPC ......... G06K 7/1417 (2013.01); G06K 19/06 (2013.01); G06K 19/06037 (2013.01); G06Q 10/087 (2013.01)

(58) Field of Classification Search
CPC .............. G06K 19/06037; G06K 19/06046
USPC .................................................. 235/487, 494
See application file for complete search history.

(56) References Cited

U.S. PATENT DOCUMENTS

| 5,481,103 | A | * | 1/1996 | Wang ............... G06K 19/06028 235/494 |
|---|---|---|---|---|
| 8,186,593 | B2 | | 5/2012 | Morgana et al. |
| 8,215,556 | B2 | | 7/2012 | Ming |
| 2008/0048044 | A1 | | 2/2008 | Zhao et al. |
| 2009/0108057 | A1 | | 4/2009 | Mu et al. |

(Continued)

FOREIGN PATENT DOCUMENTS

WO  WO-0165468 A1  9/2001

OTHER PUBLICATIONS

Langlotz, T et al, Unsynchronized 4D Barcodes Coding and Decoding Time-multiplexed 2D Colorcodes, Sep. 6, 2007.

*Primary Examiner* — Jamara Franklin
(74) *Attorney, Agent, or Firm* — HP Inc. Patent Department

(57) ABSTRACT

Examples disclosed herein relate to creating a data bearing image related to a compilation and position. In one implementation, a processor tags elements of a compilation with different data bearing images such that the data bearing images include a first information channel related to an identifier associated with the compilation and a second information channel related to relative position information within the compilation of the respective element. The processor may output information related to the compilation and tagged elements.

14 Claims, 6 Drawing Sheets

(56) References Cited

U.S. PATENT DOCUMENTS

2013/0221105 A1 8/2013 Cheong et al.
2014/0339312 A1 11/2014 Simske et al.

* cited by examiner

DATA BEARING IMAGE RELATED TO A COMPILATION AND POSITION

BACKGROUND

A data bearing image may be, for example, a 2D barcode, such as a quick response code (QR code), used to provide data related to an item associated with the data bearing image. For example, a barcode may be used to provide item and/or price information for retail items at a point of sale and throughout a supply chain.

BRIEF DESCRIPTION OF THE DRAWINGS

The drawings describe example embodiments. The following detailed description references the drawings, wherein.

DETAILED DESCRIPTION

Figure 1:
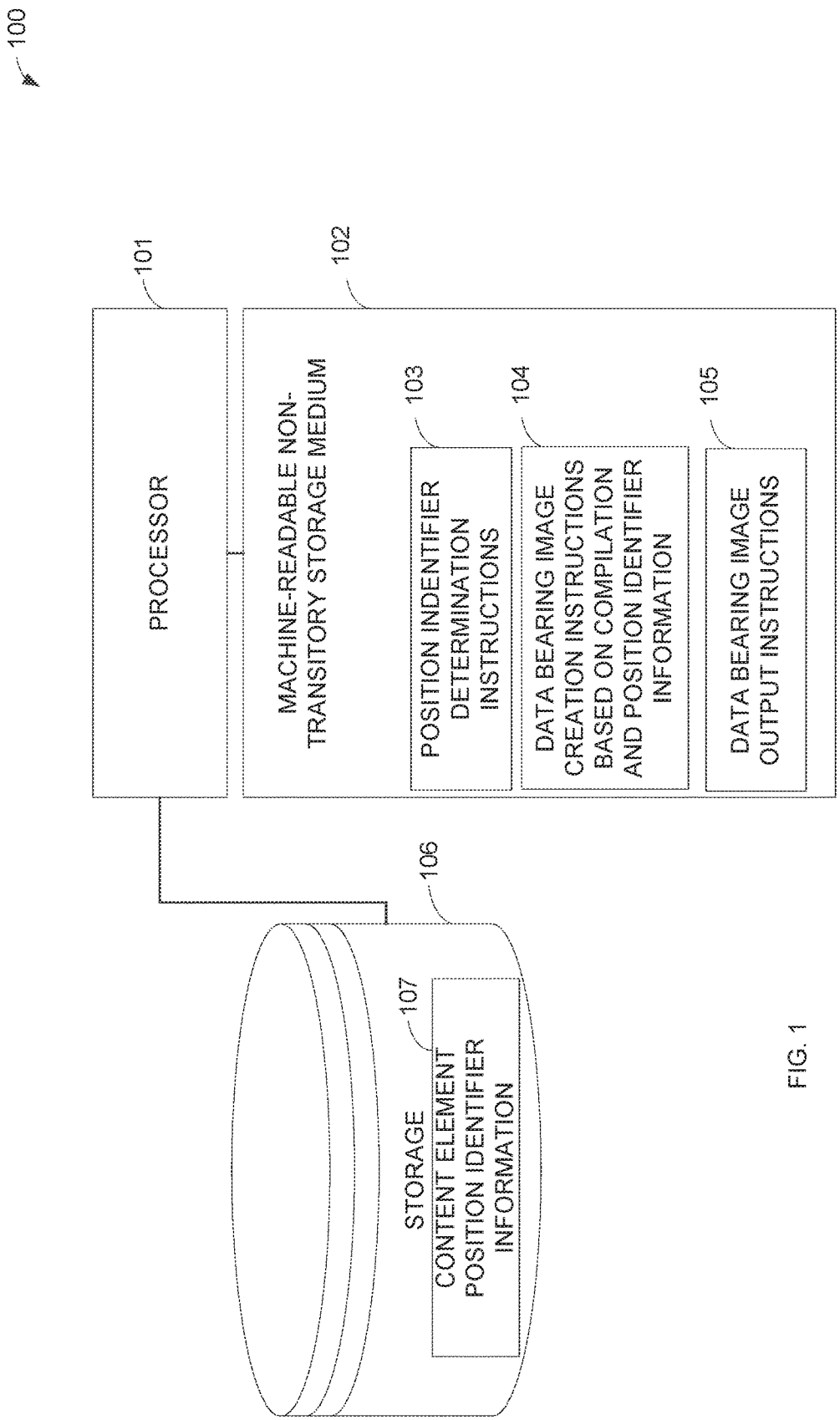
FIG. 1 is a block diagram illustrating one example of a computing system to create a data bearing image related to a compilation and position.

In one implementation, a processor tags content elements of a compilation with different data bearing images such that the data bearing images include a first information channel related to an identifier associated with the compilation and a second information channel related to relative position information within the compilation of the respective content element. For example, the relative position information represents a relationship with a parent or anchor content element and/or the relative position information represents a sequential relationship among content elements. The data bearing image may be an incremental information object, such as a progressive barcode. In one implementation, the data bearing image is a color barcode with black and white portions representing the compilation information and color portions representing the relative position information. The content elements may be print or digital and may be, for example, a page, chapter, video, image, or other type of content element.

The data bearing image information may be used to retrieve information about content associated with a compilation. For example, a storage may store information about content elements and position identifiers associated with each content element. A user device may capture an image of two data bearing images of content elements of a compilation, such as data bearing images associated with adjacent pages of a print compilation. The user device may transmit the information to a processor associated with the storage, and the processor may interpret the second information channel of the data bearing images to determine a position identifier associated with each of the content elements. The storage may retrieve content elements with associated identifiers between the two position identifiers, such as digital content element updates created after the two content elements with the data bearing images were printed. As another example, a user device may capture an image of a data bearing image associated with an anchor content element, such as a data bearing image associated with a chapter, and the processor may return content associated with the chapter. Using relative position information allows for content to be added in different manners for different compilations or in a similar manner for custom compilations for different users. A data bearing image may provide a more attractive method for displaying publication and compilation information in a complex hierarchy than lengthy identifier information used as page numbers.

Using a dual information channel data bearing image may provide security information. For example, the first information channel related to the compilation may be authenticated to determine whether the user has rights to the compilation, and content identified based on the position information may be provided based on the rights information. In one implementation, the data bearing image has a third information channel related to security. For example, the third information channel may be connected to the first information indicating the publication, such as where a barcode is used to connect to a website and additional information in a third security channel, such as color information, unlocks a security challenge used to identify a user.

A data bearing image may be useful for customized education materials such that the compilation information relates to a compilation identifier related to a particular user. For example, the user may be a student, and the user may print or electronically receive content, such as learning units, with extensions or updates such that a compilation identifier associated with a data bearing image attached to the content is associated with the personalized student workflow. In one implementation, the data bearing image includes position information specific to the personalized student workflow, such as where content may appear in a different order for different students.

FIG. 1 is a block diagram illustrating one example of a computing system to create a data bearing image related to a compilation and position. For example, the computing system 100 may create a data bearing image to provide information about the identification of a compilation associated with the content to which the data bearing image is attached and to provide relative position information within the compilation. The computing system 100 includes a processor 101, a machine-readable storage medium 102, and a storage 106.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The storage 106 may be any suitable storage, such as a database, for communicating with the processor 101. For example, the processor 101 may communicate with the storage 106 via a network. The storage 106 may include content element position identifier information 107. The content element position identifier information 107 may include information related to the relative position of a content element within a compilation. The storage 106 may have an advertised method of access such that multiple processors associated with different applications may access the storage 106. There may be multiple storages such that the storage 106 is limited to storing data related to a particular compilation or a particular entity, such as a publishing company.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable non-transitory storage medium 102 may include instructions executable by the processor 101. For example, the machine-readable storage medium 102 may include position identifier determination instructions 103, data bearing image creation instructions based on compilation and position information 104, and data bearing image output instructions 105.

The position identifier determination instructions 103 may include instructions to determine identifier information related to a position of a content element within a compilation, such as based on the relative position of the content element compared to the content element position identifier information 107. In one implementation, the position identifier determination includes looking up a position identifier associated with the content element in the storage 106. In one implementation, the position identifier determination instructions includes determining a new position identifier to associate with the content element based on information in the storage 106 related to other content elements and a method for progressively assigning position identifiers. The relative position identifier may be based on a sequential relationship to content elements associated with the compilation and/or a relationship with content nodes, such as a chapter, of a compilation. For example, the identifiers may be sequential or there may be multiple subsequent position identifiers selected based on a relationship to the previous base content position identifier. In one implementation, there is a relationship between the compilation and position identifiers such that the processor 101 may authenticate content based on whether the relationship may be validated based on interpreting the data bearing image. In one implementation, the data bearing image may also indicate additional resources, such as where information associated with the data bearing image is related to online resources and services. In one implementation, the data bearing image is used to retrieve information related to the additional resources from the storage 106.

The data bearing image creation instructions based on compilation and position information 104 may include instructions to create a data bearing image including a first information channel indicating a compilation identifier and a second information channel indicating the determined position identifier. The data bearing image may be, for example, a barcode with a first information channel represented by the black and white portions and a second information channel represented by the color portions. The relative position identifier information may be created based on a data bearing image capable of representing relationships between identifiers, such as progressive identifiers.

The data bearing image output instructions 105 may include instructions to output information related to the data bearing image to be associated with an element of content of the compilation. For example, the information may be stored, transmitted, or displayed. In one implementation, information about the created identifiers are stored in the storage 106 and associated with the content element. A data bearing image reflecting the identifiers may be stored and/or created with the associated content element is output. The data bearing image may be transmitted to be printed on the content element or to appear digitally when the content element is displayed.

Figure 2:
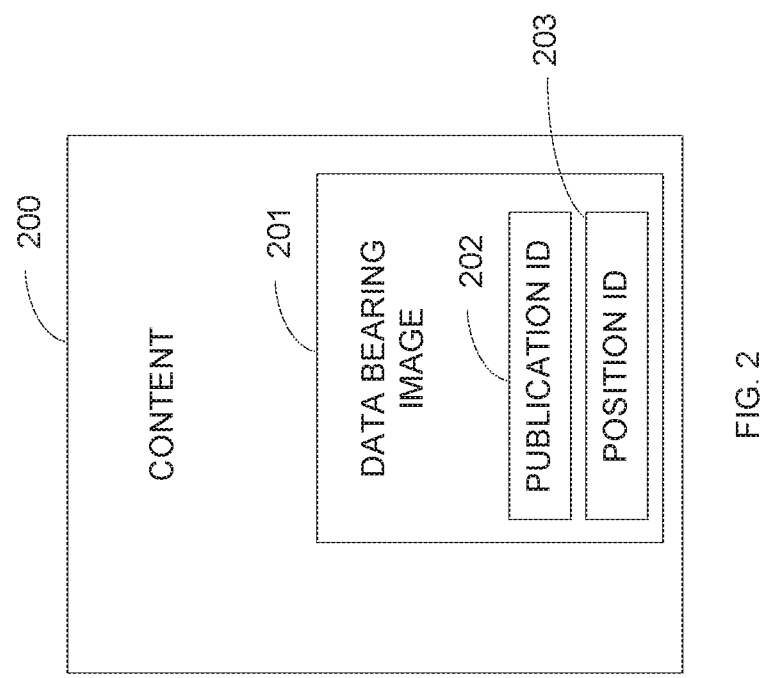
FIG. 2 is a diagram illustrating one example of an element of content including a data bearing image related to a compilation and position.

FIG. 2 is a diagram illustrating one example of an element of content including a data bearing image related to a compilation and position. Element of content 200 includes a data bearing image 201. The element of content 200 may be any type of content that may include a data bearing image, such as a text, image, or video content, or a combination of content types. The data bearing image 201 may be any suitable type of image capable of including information about multiple types of identifiers. For example, the data bearing image 201 may be a barcode or steganographic halftone. The date bearing image 201 may include a compilation ID 202 and a position ID 203. In one implementation, the data bearing image 201 is a barcode where the compilation ID 202 is represented by the placement of black and white tiles, and the position ID 203 is represented by the placement of color tiles. The data bearing image 201 may be an incremental information object, such as a progressive barcode, such that it represents a relative progression between content elements to represent relative position information.

Figure 3:
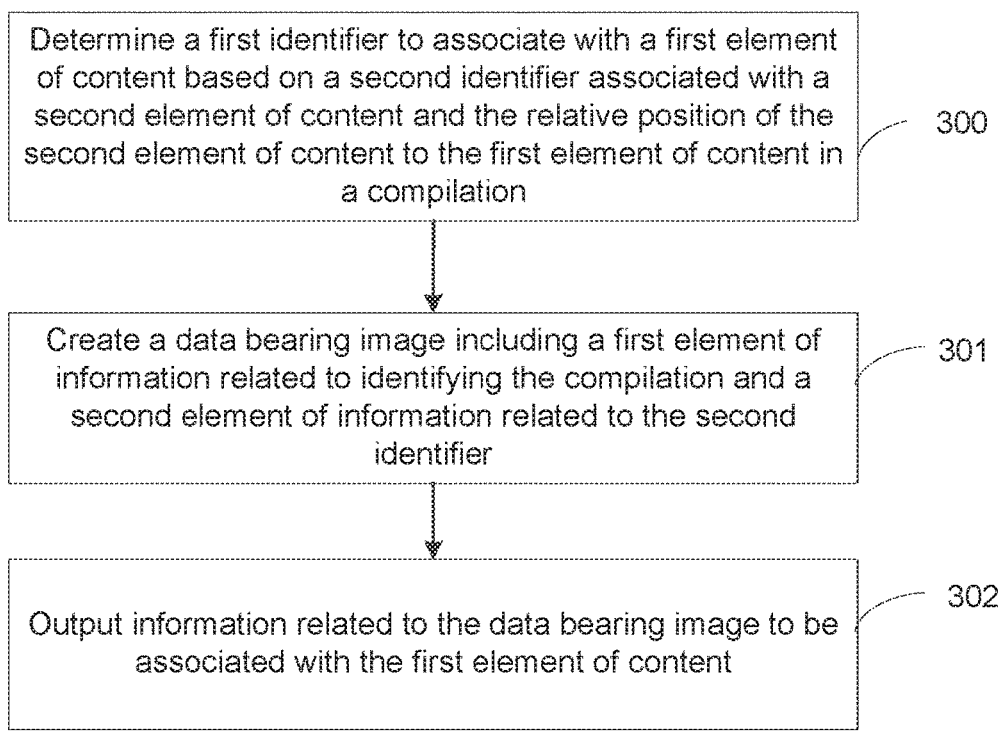
FIG. 3 is a flow chart illustrating one example of a method to create a data bearing image related to a compilation and position.

FIG. 3 is a flow chart illustrating one example of a method to create a data bearing image related to a compilation and position. The data bearing image may be created to appear on a digital or print content element within the compilation. The data bearing image may include a first information channel related to a compilation and a second information channel related to a relative position of the associated content element within the compilation. The data bearing image may be, for example, an incremental information object capable of representing a progression of identifiers such that the order of the position information may be mathematically determined based on a comparison. The method may be implemented, for example, by the processor 101 of FIG. 1.

Beginning at 300, a processor determines a first identifier to associate with a first element of content based on a second identifier associated with a second element of content and the relative position of the second element of content to the first element of content in a compilation. The relative position information may indicate, for example, a sequential relationship between content and/or a parallel relationship such that multiple pieces of content have identifiers associated with the same anchor content node. The first and second content elements may be any suitable types of content elements, such as text, images, or video. The content elements in the compilation may be a combination of digital and print materials. In one implementation, the two information channels are related, such as where a bit string may be determined based on the data bearing image and a portion is related to the compilation and a portion is related to position.

The first identifier may be determined based on a progressive relationship to the second identifier. There may be any suitable relationship between the first content element and the second content element. The second content element may have a sequential relationship with the first content element such that the position identifier is progressive between the two content elements. In one implementation, the compilation includes content nodes with position relationships with other content elements such that content elements associated with the same node do not have a progressive relationship with one another. A relative position between the content elements may be compilation specific, such that the first content element is a previous piece of content to the second content element in a first compilation, but a subsequent piece of content to the second content element in a second compilation. As another example, a content node indicating a beginning of a chapter may include content in the same order, but the chapter itself may appear in a different position in different compilations. There may be a nested hierarchy related to the position identifier, such as where a data bearing images represent both the relative position of a chapter within the compilation and the position of the content element within the particular chapter.

The data bearing image may represent multiple types of position relationships within the same compilation. For example, a chapter may be a content node representing anchor content with an identifier that progresses from chapter to chapter in a sequential manner, and the pages within the chapter may have a parallel position relationship such that multiple pages have a position identifier representing a relationship to the same chapter such that there is not a sequential relationship between content within the same chapter.

As an example, a first chapter may have a position identifier as 00000000001100000000, and a second chapter may have a position identifier progressing by four 1's to 00000001111110000000. A page within the first chapter may include a data bearing image representing a position identifier between the two identifiers, such as where the page as four 1's (half of the progression). The resulting six possible position identifiers includes 00000001001110000000, 00000000101110000000, 00000000011110000000, 00000000110110000000, 00000001011100000000, and 00000000111100000000. A processor may determine how to create the progression based on a number of desired elements of content to be insertable. For example, the number of insertable content elements may be determined by the processor based on $(X/2)/[(X/4)!(X/4)!]$ where ! is the factorial operator and X is the increment in binary 1's between the two content element position identifier boundaries.

Continuing to 301, the processor creates a data bearing image including a first element of information related to identifying the compilation and a second element of information related to the second identifier. The first element related to identifying the compilation may be a fixed identifier, such as an IBSN associated with a publication. The compilation identifier may be associated with a specific user or set of users and/or there may be a third identifier related to user permissions.

The compilation may be any suitable compilation. The compilation may include both digital and print materials where each type includes a data bearing image. The compilation may include, for example, text documents, videos, and images. The compilation may be related to formal education or training. The compilation may be a compilation featuring updates, such as a travel related compilation. The compilation may be, for example, a work related document including different pieces of a workflow.

The data bearing image may be any suitable data bearing image, such as a 2D barcode, for example a QR code, or a steganographic halftone. The data bearing image may include information in different formats, such as a barcode with black and white information representing a first type of information and color information representation a second type of information. Multiple types of information may be represented in the same format, such as a first set of bits representing a first type of information and a second set of bits representing a second type of information. In one implementation, the data bearing image includes both overt and covert information, such as where the compilation information is visible but the position information is not, or vice versa. The data bearing image may be an incremental information object, such as a progressive barcode, such that a change in the data bearing image indicates a progression in a position between content elements.

Continuing to 302, the processor outputs information related to the data bearing image to be associated with the first element of content. The processor may output the information by displaying, transmitting, and/or storing it. In one implementation, the processor stores identifier information and creates the data bearing image at a later point to output to content when it is requested based on a user query. For example, the data bearing image may be printed on print content or displayed on digital content. The stored information may include information about an association between the content element and the publication identifier and position identifier.

In one implementation, the processor receives a request to identify content based on a received compilation and position identifier. For example, the query may request content occurring after a position identifier or associated with a position identifier and/or content occurring between two position identifiers. As an example, a compilation may allow students to associate notes with the content, and the content may have a relationship with a content node. A processor may determine position information based on a data bearing image received from a user device. A query may request content associated with the received position identifier.

Figure 4:
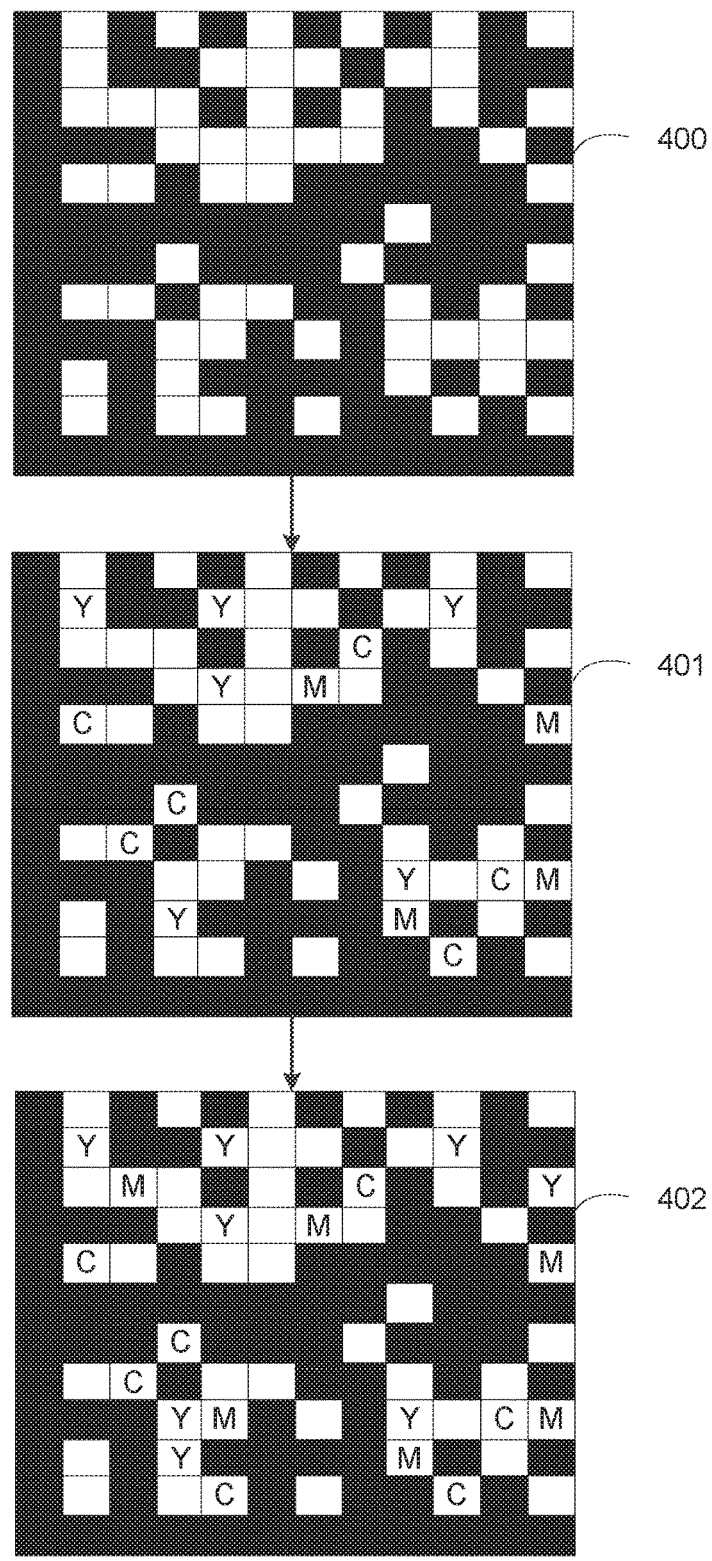
FIG. 4 is a diagram illustrating one example of a set of data bearing images including compilation and position information in a sequential manner.

FIG. 4 is a diagram illustrating one example of a set of data bearing images including compilation and position information in a sequential manner. For example, the barcode 400 may include black and white portions to represent identification information associated with a compilation. A user may scan a barcode such that the black and white information is interpreted. The barcode 400 represents "TEXT" in the placement of the black and white tiles as an identifier for a compilation. The barcodes 401 and 402 may appear on different pages in a compilation represented by barcode 400 such that the page associated with barcode 401 is intended to occur before the page associated with the barcode 402.

The barcode 401 includes both black and white and color information such that the black and white information represents the same compilation identification information as the barcode 400, and the color information represents position information within the compilation, such as sequential position information and/or position relative to a content node anchor. For example, within the same compilation the position of the black and white tiles may remain constant, and the position and color of the color tiles varies for each content element based on the relative position between the content elements. The color information may be light enough to appear white to a barcode reader, and custom imaging software may be used to read the color information.

The color information is shown on FIG. 4 such that C represents cyan, M represents magenta, and Y represents yellow. The colors may represent two bit changes in a progression, such as where white=00, yellow=01, cyan=10, and magenta=11. A similar progression may be created with other colors and bit representations. A second set of color option progressions may indicate further bit identifiers, such as where the CMY color scheme may progress to an RGB color scheme. For example, for a yellow tile, Y=0 and Y changed to G=1; for a cyan tile, C=0 and C changed to B=1; and for a magenta tile, M=0 and a change to R=1. Changes are indicated in a forward manner, for example, such that C does not become white. A processor may select different paths from white to black based on the number of desired available paths.

In one implementation, a processor determines the size of a data bearing image such that it may include the desired numbers of progressions without changing size as it includes more information. The processor may determine a number of bits to increment or color changes to make per progression based on the number of data tiles or the number of white data tiles that are able to change after the compilation information is encoded as black tiles. In one implementation, the processor selects a new identifier such that it enforces at least one color change between position identifiers, and the size of the data bearing image may be determined to allow for the desired number of progressions while enforcing the color change policy. In one implementation, the progression starts over at particular content nodes, such as a change in topic or chapter.

Barcode 401 includes 16 changes from barcode 400 to indicate that it is associated with page 16. Barcode 402 includes 6 additional changes from barcode 401 to indicate that it is page 22. In one implementation, the barcodes include relative information, such as where the 16 represents a relative position in a chapter or other subsection of a compilation. With the sequential nature of the identifiers, an image capture of two barcodes may be used to determine the content that falls in between based on a database lookup for position information between the position information associated with the two barcodes.

Figure 5:
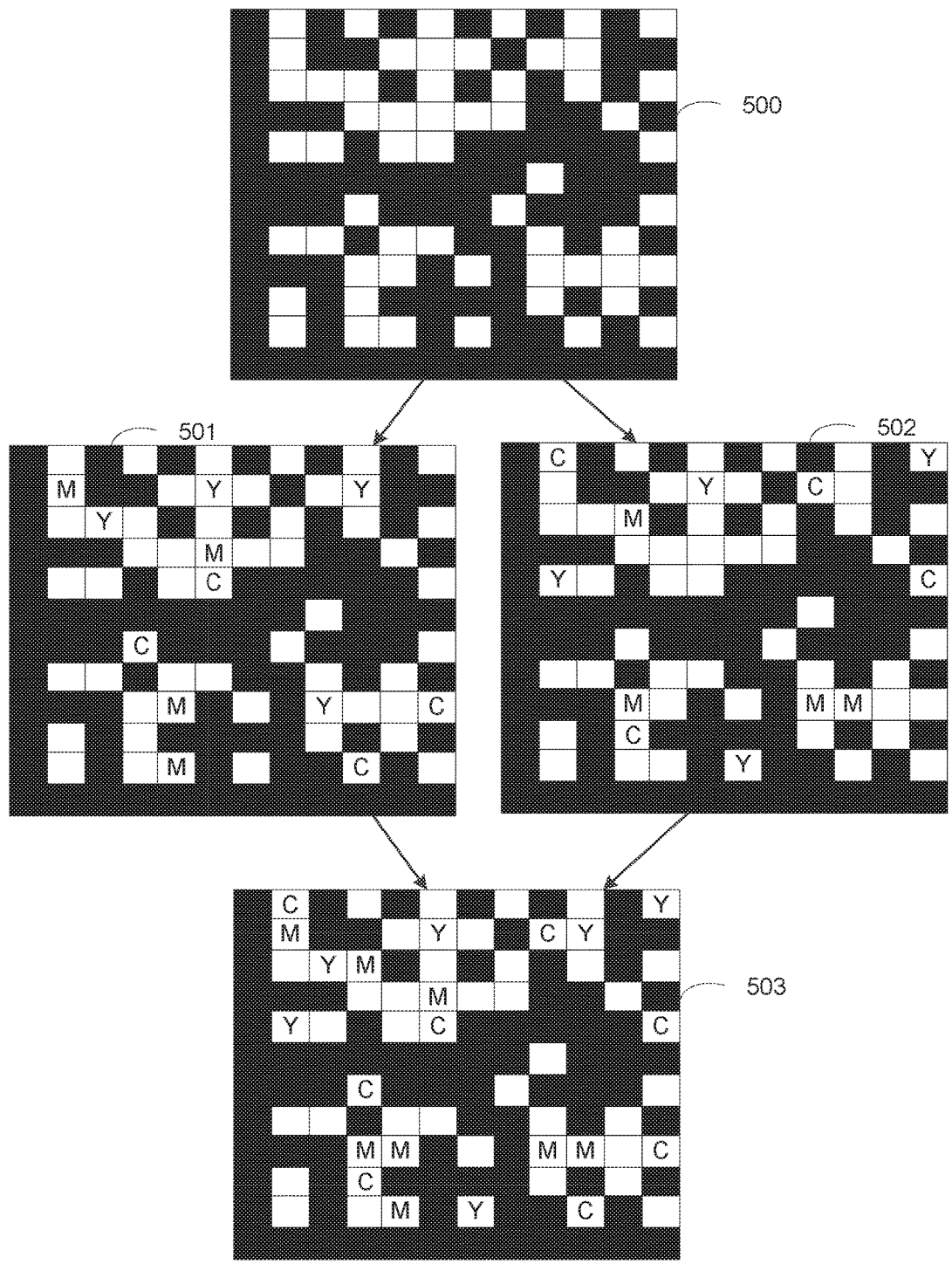
FIG. 5 is a diagram illustrating one example of a set of data bearing images including compilation and position information in a parallel manner.

FIG. 5 is a diagram illustrating one example of a set of data bearing images including compilation and position information in a parallel manner. For example, a data bearing image may include a first information channel related to the compilation and a second information channel related to a relative position compared to a content node, such as a beginning of a chapter. The parallel nature of the identifiers may be used where content is associated with each other but not in a sequential manner, such as where students contribute content to a section of a book. In one implementation, a user may capture an image of a data bearing image associated with a node of base content and receive information about content associated with that node. In one implementation, a user may capture an image of two data bearing images, each associated with a separate piece of base content. For example, an identifier associated with chapter 1 and an identifier associated with chapter 5 may be used to produce content associated with chapters 1-5. In one implementation, a user may capture an image of extraneous content associated with chapter 2 and chapter 5. The position of the pieces of the content within the chapters may not be set, but the user may receive a set of content associated with both the chapters associated with the two data bearing images. In one implementation, a compilation may have both sequential and parallel position sections represented by different types of progressive schemes.

The barcodes 500-503 include compilation information in the black and white information and relative position information in the color information. The color information is represented as CMY (cyan, magenta, and yellow), and the progression pattern is the same as described above in relation to FIG. 4. Barcode 500 represents information related to a compilation at node position 0. Barcode 503 is a second compilation node with a progressive relationship to barcode 500. The barcodes 501 and 502 have a progressive relationship in between barcodes 500 and 503, but they do not have a progressive relationship to one another. In one implementation, a processor may add a new piece of base content with a first position identifier scheme and associate content elements with the base content based on a second position identifier scheme.

Figure 6:
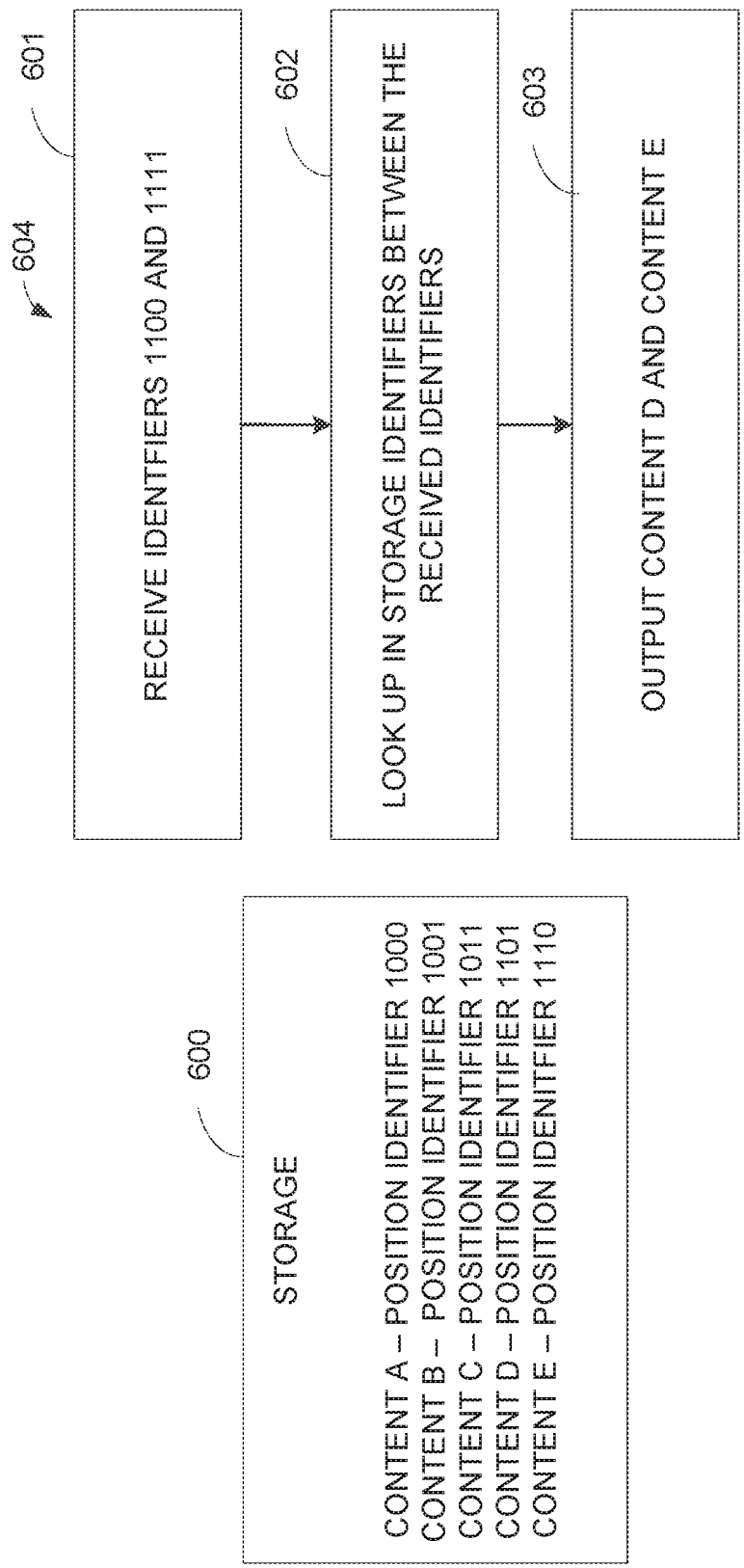
FIG. 6 is a diagram illustrating one example of a method to identify content based on a data bearing image related to a compilation and position.

FIG. 6 is a diagram illustrating one example of a method to identify content based on a data bearing image related to a compilation and position. The storage 600 includes information about content and associated position identifier information. For example, an update to content may be positioned within existing content such that an identifier is selected that is sequentially related to an identifier associated with previous content and/or such that the identifier is selected to be related to base content identifier, for example, related to a chapter.

The flow chart 604 shows how content may be identified based on position information stored in the storage 600. Beginning at 601, a processor receives identifiers 1100 and 1111. For example, a user may capture an image of a data bearing image on sequential pages in a print and/or digital compilation. A processor may interpret the data bearing image to determine that the first data bearing image is associated with a page at position 1100 and the second data bearing image is associated with a page at position 1111. The user device may transmit the position identifier information to a processor for determining content.

Continuing to 602, the processor looks up stored identifiers between the received identifiers 1100 and 1111. In the storage 600, content D and content E are associated with position identifiers between 1100 and 1111. In one implementation, the processor queries the storage 600 for content associated with a compilation ID and content within that subset associated with the compilation with position IDs indicating a relationship with the receive identifiers.

Continuing to 603, the processor outputs information related to content D and E. For example, the processor may output content D and E such that the content includes data bearing images with a compilation ID and a position ID. The content may be transmitted, displayed, and/or stored. For example, the content may be sent to a user that may determine whether to view or print the content. In one implementation, the retrieved content is in a different format than the content that is associated with the received identifiers, such as where a user captures images of data bearing images on text content and receives associated video content. In one implementation, the user may determine the amount of content to receive, such as by selecting a beginning content and ending content element for which the user would like to receive related video content. Using data bearing images to represent compilation information allows for an aesthetically pleasing and efficient method for content updates.

The invention claimed is:

1. A computing system, comprising:
a storage to store information about content elements associated with position identifier information; and
a processor to:
determine a position identifier to indicate the relative position of a content element within a compilation based on the stored content element and position identifier information;
create a data bearing image including a first information channel indicating the compilation and a second information channel indicating the position identifier, wherein the data bearing image comprises a barcode and wherein the first information channel comprises black and white tiles of the barcode and wherein the second information channel comprises color tiles, wherein a position and a color of the color tiles varies within a same compilation of the black and white tiles; and output information related to the data bearing image to be associated with the content element.

2. The computing system of claim 1, wherein outputting the information comprises outputting the information to an element of content and storing information about the association between the position identifier and the element of content in the storage.

3. The computing system of claim 1, wherein the processor is further to select the position identifier based on a sequential relationship to an identifier associated with an element of content in a previous position.

4. The computing system of claim 1, wherein the processor is further to select the position identifier based on a relationship to a previous base content position identifier such that multiple subsequent position identifiers are selected based on a relationship to the previous base content position identifier.

5. A method, comprising:
determining a first identifier to associate with a first element of content based on a second identifier associated with a second element of content and the relative position of the second element of content to the first element of content in a compilation;
creating, by a processor, a data bearing image including a first element of information related to identifying the compilation and a second element of information related to the second identifier, wherein the data bearing image comprises a barcode and wherein the first information channel comprises black and white tiles of the barcode and wherein the second information channel comprises color tiles, wherein a position and a color of the color tiles varies within a same compilation of the black and white tiles; and
outputting information related to the data bearing image to be associated with the first element of content.

6. The method of claim 5, further comprising comparing a received position identifier to the first identifier to determine a relative position of content associated with the received identifier compared to content associated with the first identifier.

7. The method of claim 5, further comprising:
receiving data bearing image information associated with a third content element, wherein the data bearing image includes information related to a position identifier and compilation associated with the third content element;
validating permissions information based on the compilation information associated with the received data bearing image information; and
determining whether to output content related to the position identifier associated with the received data bearing image information based on the validation.

8. The method of claim 5, further comprising storing in a storage information about as association between the first identifier and the first element of content.

9. The method of claim 5, wherein the first identifier includes information related to a user associated with the compilation.

10. A machine-readable non-transitory storage medium comprising instructions executable by a processor to:
tag elements of a compilation with different data bearing images such that the data bearing images include a first information channel related to an identifier associated with the compilation and a second information channel related to relative position information within the compilation of the respective element, wherein the data bearing image comprises a barcode and wherein the first information channel comprises black and white tiles of the barcode and wherein the second information channel comprises color tiles, wherein a position and a color of the color tiles varies within a same compilation of the black and white tiles; and
output information related to the compilation and tagged elements.

11. The machine-readably non-transitory storage medium of claim 10, wherein the data bearing image comprises a progressive barcode.

12. The machine-readable non-transitory storage medium of claim 10, further comprising instructions to:
compare relative position information to stored information related to content and associated position information; and
identify content based on the comparison.

13. The machine-readable non-transitory storage medium of claim 10, further comprising instructions to associate a compilation identifier with a particular user.

14. The machine-readable non-transitory storage medium of claim 10, wherein some elements of the compilation are print materials and other elements of the compilation are digital materials.

* * * * *

UNITED STATES PATENT AND TRADEMARK OFFICE
CERTIFICATE OF CORRECTION

PATENT NO. : 10,268,857 B2
APPLICATION NO. : 15/570034
DATED : April 23, 2019
INVENTOR(S) : Steven J Simske et al.

It is certified that error appears in the above-identified patent and that said Letters Patent is hereby corrected as shown below:

In the Claims

In Column 10, Line 33, in Claim 11, delete "machine-readably" and insert -- machine-readable --, therefor.

Signed and Sealed this
Third Day of September, 2019

Andrei Iancu
*Director of the United States Patent and Trademark Office*